F. E. SMALL.
RIM TOOL.
APPLICATION FILED JUNE 1, 1920.

1,390,826.

Patented Sept. 13, 1921.
2 SHEETS—SHEET 1.

Inventor
Frederick E. Small
by Roberts, Roberts & Cushman
his Attorneys

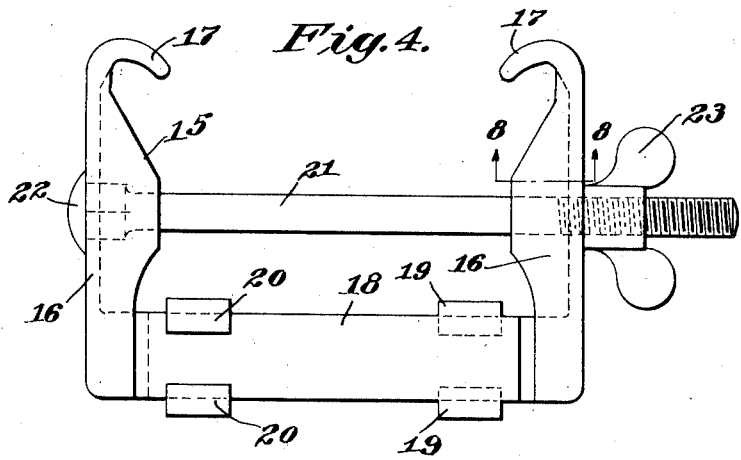
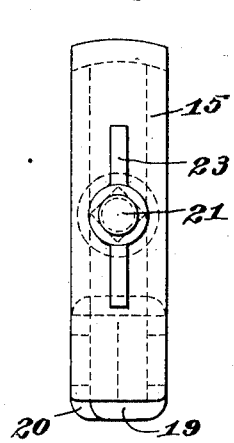
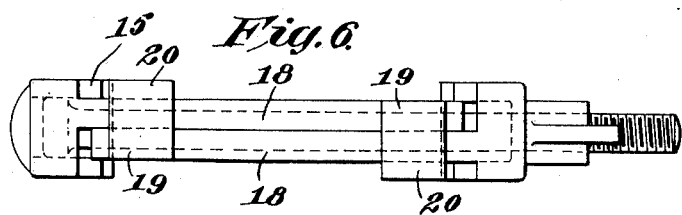
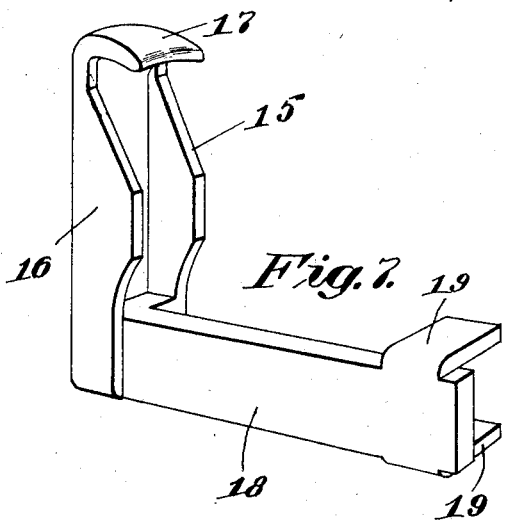
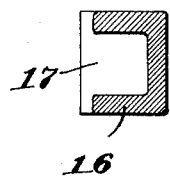

UNITED STATES PATENT OFFICE.

FREDERICK E. SMALL, OF NEEDHAM, MASSACHUSETTS.

RIM-TOOL.

1,390,826.  Specification of Letters Patent.  Patented Sept. 13, 1921.

Application filed June 1, 1920. Serial No. 385,402.

*To all whom it may concern:*

Be it known that I, FREDERICK E. SMALL, a citizen of the United States, and resident of Needham, in the county of Norfolk and State of Massachusetts, have invented new and useful Improvements in Rim-Tools, of which the following is a specification.

My invention relates to a new and improved apparatus for use in connection with a demountable split rim, and more particularly for use in both contracting the split rim for the purpose of removing the tire and in again expanding the rim into engagement with a tire.

These demountable rims in general use upon automobiles are transversely split and in order to remove or replace a tire on the rim it is necessary that the portion of the rim adjacent one side of the split be drawn in so that the split ends may telescope past each other to thus reduce the diameter of the rim. Since the rims are formed of stiff metal and the ends are held in engagement by the tire and moreover are often rusted together, considerable force must be applied to open the rim. Further, since the rim is in close engagement with the tire, very considerable force is often required to again bring the ends of the rim together.

A number of mechanical devices have heretofore been devised for the purpose of accomplishing these desired results, but these tools have usually been either very heavy, cumbersome and expensive or else they have been too light to permit the application of adequate leverage and have required considerable physical exertion and dexterity in their use. A tool of this character is needed for emergency use and is to be carried upon the vehicle. Both space and weight are at a premium in a tool box and the tool should be as light and compact as is consistent with the requisite strength.

It is an object of my invention to provide means for both contracting and expanding a demountable rim, the means being light in weight and compact in construction. It is an object to provide a device of this character which is simple and efficient in use and which requires no great strength for its operation. More specifically it is an object to provide a device adapted for use with a jack of any usual construction, the jack furnishing the mechanical leverage for the operation of the device. Further it is an object to provide a device formed of but few and simple parts which is relatively inexpensive to manufacture. Other and further objects will appear as the description proceeds.

Broadly my device comprises means adapted to be detachably connected to the demountable rim, and means adapted to transmit the movement of a jack to the connecting means for drawing the ends of the rim inward. Further the means on the rim are adapted to directly receive the thrust of a jack for expanding the rim.

A jack of some sort is an essential part of the equipment of every motor vehicle, and by utilizing this jack for the source of power, my invention avoids the addition of a heavy and expensive rim tool to the equipment.

I have shown certain preferred embodiments of my device in the accompanying drawings, in which—

Fig. 4 is a face view of my rim clamp;

Fig. 5 is an end view of Fig. 4;

Fig. 6 is a view of Fig. 4 as seen from below;

Fig. 7 is a perspective of one of the elements of my rim clamp; and

Fig. 8 is a section on line 8—8 of Fig. 4.

Figure 1:
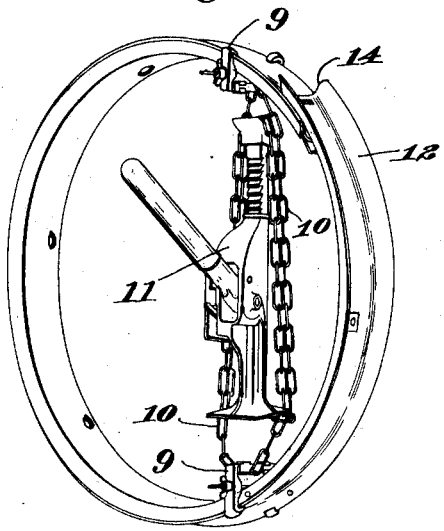
Figure 1 is a perspective view showing my device in use in contracting a rim.

As shown in Fig. 1 my device comprises the clamp members 9 and the chains 10 adapted to coöperate with the jack 11, one of the clamp members being attached to the rim 12 adjacent the split 14 and the other clamp fitting the rim at a point approximately opposite.

Figure 2:
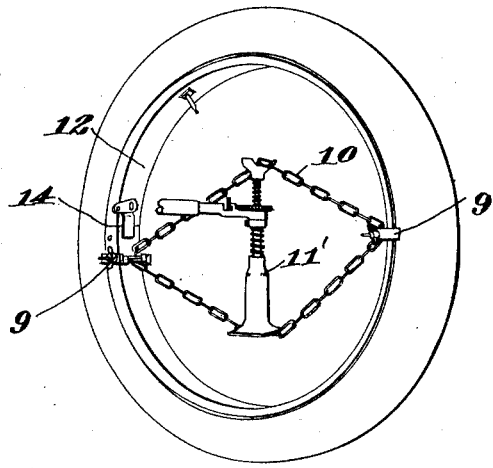
Fig. 2 is a view similar to Fig. 1 but showing a somewhat different method of use.

In Fig. 2, a somewhat different form of jack 11 is shown and only a single chain 10 is used.

Figure 3:
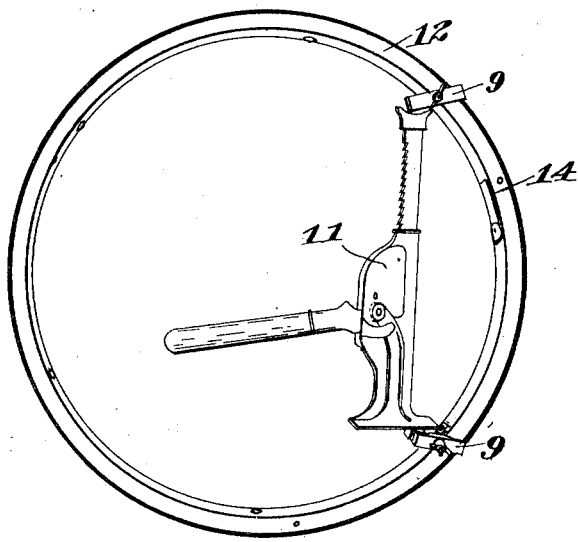
Fig. 3 is a perspective view showing my device in use in expanding a rim.

Fig. 3 shows the clamps 9 placed adjacent the split 14 and serving as abutments for the jack 11 in forcing the rim ends out into engagement.

Figs. 4 to 8 show in detail the preferred construction of the clamp members 9. These members comprise two similar clamp bars 15, one of which is shown in perspective in Fig. 7. These clamp bars 15 comprise the upwardly extending portions 16, which are preferably of the form shown in cross section in Fig. 8 to assure both strength and lightness, and the upper end of the portion 16 is provided with the rim engaging hook 17. The transverse portions 18 of the bars as shown in the drawing are preferably greater in the vertical than in the horizontal dimension in order to render them rigid against the pull of the chain. Adjacent the end of each bar 18 are the guide flanges 19 adapted to be bent around the other bar 18 when the clamp is assembled, the bent ends 20 serving to hold the two bars in intimate sliding engagement. The members 15 are preferably of malleable iron to permit this bending and to insure strength.

The two members 15 are moved together by the screw bolt 21, the head 22 bearing on one member and the wing nut 23 on the other.

The chains 10 of my device are of any suitable form and are made approximately twice the diameter of the rim in length. The chain is preferably not continuous but the ends are provided with hooks so that they may be joined.

In using my device to contract a rim the clamps are attached to the rim in the position shown in Figs. 1 and 2. It is not necessary to screw up the clamp nut 23 very tightly as no strain is put upon it and it acts rather as an adjustment than as a clamp.

If using the method of Fig. 1, two chains are used, one being passed through each clamp between the bolt 21 and the bar 18 and the ends of each being joined. A jack of any type is now placed as shown in Fig. 1, the loop of the chain connected to the lower clamp being passed above the jack, and that of the upper clamp being passed below the foot of the jack. The jack is now operated in the usual manner and its elongation serves to separate the rim ends by pulling upon the two chains.

If desired a single chain may be used as shown in Fig. 2. Here the chain is passed through the two clamp members 9 and its end joined. The jack is then inserted in the loop of the chain and placed in a direction perpendicular to the line connecting the two clamps, as shown in the figure. Raising the jack serves to bring the end of the rim in as before.

In expanding the rim the two clamps are placed, as shown in Fig. 3, sufficiently close together so that the jack will bear upon both of them. Elongation of the jack serves to thrust the clamps apart and to positively force the opposing ends of the rim into engagement.

The thrust upon the lower portion 18 of the clamps causes the inwardly inclined portions of the members 16 or the bolt 21 to contact with the inner side of the rim and act as a fulcrum, thus forcing the edge of the hooks 17 into firm engagement with the rim edge and preventing slipping of the clamps. The form of the hooks 17 may be varied to suit different forms of rims.

I have shown different forms of jacks in use with my device simply to indicate that the particular form of jack is immaterial. Any jack of a type ordinarily in use with an automobile may be used. Thus it will only be necessary for a motorist already supplied with a jack to add to his equipment my chains and clamps which are relatively light in weight and will pack into a small compass in his tool box. The operation of the device is simple and takes but a few minutes, and due to the leverage supplied by the jack even the most stubborn rim can be operated with but little muscular exertion.

I claim:—

1. Rim expanding or contracting means, adapted to be either expanded or contracted by the purely expanding action of a jack, comprising a pair of unconnected rim gripping devices affording each a positive abutting surface for the usual thrust-surfaces of an interposed jack, and also a surface engageable oppositely from the first-mentioned surface for contracting action and an endless flexible element capable of being looped about both said clamps and of receiving a jack within its loop.

2. Rim expanding or contracting means, adapted to be either expanded or contracted by the purely expanding action of a jack, comprising a pair of unconnected rim gripping devices affording each a positive abutting surface for the usual thrust-surfaces of an interposed jack, and also a surface engageable oppositely from the first-mentioned surface for contracting action and an endless flexible element capable of being looped about both said clamps and of receiving a jack within its loop transversely to a line between said rim-gripping devices.

Signed by me at Boston, Massachusetts, this 27th day of May, 1920.

FREDERICK E. SMALL.